(12) United States Patent
Kim et al.

(10) Patent No.: US 9,893,374 B2
(45) Date of Patent: Feb. 13, 2018

(54) REINFORCED COMPOSITE ELECTROLYTE MEMBRANE FOR FUEL CELL

(71) Applicant: LG CHEM, LTD., Seoul (KR)

(72) Inventors: Eun Ju Kim, Daejeon (KR); Chong Kyu Shin, Daejeon (KR); Bong Keun Lee, Daejeon (KR); Seong Ho Choi, Jinhae-si (KR)

(73) Assignee: LG CHEM, LTD., Seoul (KR)

( * ) Notice: Subject to any disclaimer, the term of this patent is extended or adjusted under 35 U.S.C. 154(b) by 129 days.

(21) Appl. No.: 14/678,688

(22) Filed: Apr. 3, 2015

(65) Prior Publication Data
US 2015/0214563 A1    Jul. 30, 2015

Related U.S. Application Data

(62) Division of application No. 11/729,931, filed on Mar. 30, 2007, now Pat. No. 9,054,357.

(30) Foreign Application Priority Data

Mar. 31, 2006 (KR) .................. 10-2006-0029839

(51) Int. Cl.
*H01M 8/1053* (2016.01)
*H01M 8/1058* (2016.01)
(Continued)

(52) U.S. Cl.
CPC ......... *H01M 8/1053* (2013.01); *H01M 8/103* (2013.01); *H01M 8/106* (2013.01);
(Continued)

(58) Field of Classification Search
CPC .................................................. H01M 8/1053
See application file for complete search history.

(56) References Cited

U.S. PATENT DOCUMENTS 5,547,551 A * 8/1996 Bahar ............... B01D 67/0088
                                                   204/296
5,559,614 A    9/1996 Urbish et al.
(Continued)

OTHER PUBLICATIONS

Picart et al., Ph Chem, 2004, 108, 7196-7205.

*Primary Examiner* — Melvin C Mayes
*Assistant Examiner* — Michael Forrest
(74) *Attorney, Agent, or Firm* — Dentons US LLP

(57) ABSTRACT

Disclosed is a composite electrolyte membrane comprising a microporous polymer substrate and a sulfonated polymer electrolyte. The composite electrolyte membrane comprises: a first polymer electrolyte layer formed of a first non-fluorinated or partially-fluorinated sulfonated polymer electrolyte; a non-fluorinated or partially-fluorinated microporous polymer substrate stacked on the first polymer electrolyte layer, wherein pores of the microporous polymer substrate are impregnated with a second non-fluorinated or partially-fluorinated sulfonated polymer electrolyte, and the first polymer electrolyte and the second polymer electrolyte are entangled with each other on an interface thereof; and a third polymer electrolyte layer formed on the microporous polymer substrate impregnated with the second polymer electrolyte by a third non-fluorinated or partially-fluorinated sulfonated polymer electrolyte, wherein the second polymer electrolyte and the third polymer electrolyte are entangled with each other on an interface thereof. A method for manufacturing the composite electrolyte membrane, and a membrane-electrode assembly (MEA) and a fuel cell comprising the composite electrolyte membrane are also disclosed.

8 Claims, 3 Drawing Sheets

(51) Int. Cl.
　　　*H01M 8/1007*　　(2016.01)
　　　*H01M 8/1067*　　(2016.01)
　　　*H01M 8/1039*　　(2016.01)
　　　*H01M 8/103*　　(2016.01)
　　　*H01M 8/1062*　　(2016.01)
　　　*H01M 8/1034*　　(2016.01)
　　　*H01M 8/1025*　　(2016.01)
　　　*H01M 8/04082*　　(2016.01)
　　　*H01M 8/1027*　　(2016.01)
　　　*H01M 8/1032*　　(2016.01)
　　　*H01M 8/1023*　　(2016.01)
　　　*H01M 8/106*　　(2016.01)
　　　*H01M 8/1081*　　(2016.01)

(52) U.S. Cl.
　　　CPC ....... *H01M 8/1007* (2016.02); *H01M 8/1023* (2013.01); *H01M 8/1025* (2013.01); *H01M 8/1034* (2013.01); *H01M 8/1039* (2013.01); *H01M 8/1058* (2013.01); *H01M 8/1062* (2013.01); *H01M 8/1067* (2013.01); *H01M 8/1081* (2013.01); *H01M 8/04197* (2016.02); *H01M 8/1027* (2013.01); *H01M 8/1032* (2013.01); *H01M 2300/0082* (2013.01); *H01M 2300/0088* (2013.01); *H01M 2300/0094* (2013.01); *Y02E 60/521* (2013.01); *Y02P 70/56* (2015.11)

(56) References Cited

U.S. PATENT DOCUMENTS

| | | | |
|---|---|---|---|
| 5,672,438 A * | 9/1997 | Banerjee | C08J 5/2237 |
| | | | 429/494 |
| 6,316,066 B1 | 11/2001 | Jolliffe et al. | |
| 6,514,561 B1 * | 2/2003 | Mallant | C08J 5/2243 |
| | | | 427/115 |
| 6,562,446 B1 * | 5/2003 | Totsuka | C25B 13/00 |
| | | | 204/252 |
| 6,818,339 B1 | 11/2004 | Sugawara et al. | |
| 2003/0099874 A1 * | 5/2003 | Kim | C08J 5/2218 |
| | | | 429/492 |
| 2004/0138352 A1 | 7/2004 | Taniguchi et al. | |
| 2005/0042489 A1 * | 2/2005 | Fukuta | H01M 4/925 |
| | | | 429/483 |
| 2005/0079399 A1 | 4/2005 | Xiao et al. | |
| 2007/0265426 A1 | 11/2007 | Allcock et al. | |

* cited by examiner

■ SULFONATED POLYMER ELECTROLYTE
▨ MICROPOROUS POLYMER FILM

→ NON-FLUORINATED POLYMER MICROPOROUS FILM +
NON-FLUORINATED POLYMER ELECTROLYTE (SURFACTANT ADDED)

REINFORCED COMPOSITE ELECTROLYTE MEMBRANE FOR FUEL CELL

This application is a Divisional of U.S. application Ser. No. 11/729,931 filed Mar. 30, 2007 and claims the benefit of Korean Patent Application No. 10-2006-0029839 filed on Mar. 31, 2006, all of which are hereby incorporated by reference in their entirety for all purposes as if fully set forth herein.

TECHNICAL FIELD

The present invention relates to a reinforced composite electrolyte membrane for a fuel cell and a method for manufacturing the same.

BACKGROUND ART

Fuel cells are energy conversion systems that convert chemical energies of fuels directly into electric energies. Fuel cells have high energy efficiency, and are environmentally friendly in that they are substantially free from emission of pollutants. Therefore, there have been many studies about fuel cells as alternative energy sources.

Among such fuel cells, polymer electrolyte membrane fuel cells (PEMFCs) are particularly advantageous, because they have low drive temperature, are free from the leakage problem by the use of a solid electrolyte, and allow high-speed operation. Thus, PEMFCs have been spotlighted as portable, automotive and household power sources. Additionally, as compared to other types of fuel cells, PEMFCs provide high output under high current density, can be operated at a temperature lower than 100° C., have a simple structure, exhibit high initiation and response characteristics, and show excellent durability. In addition to the above, PEMFCs allow the use of hydrogen gas, methanol or natural gas as fuel. Further, continuous research and development has been conducted to provide PEMFCs as portable fuel cells because of their high output density permitting significant size reduction.

An ion exchange membrane, used as a solid electrolyte in a fuel cell, is interposed between both electrodes and allows protons generated at an anode to move toward a cathode. Herein, a polymer membrane having a sulfonic acid group (—SO₃H) introduced thereto is widely used as an electrolyte.

In general, electrolytes used in PEMFCs may be divided into perfluorinated polymer electrolytes and hydrocarbon-based polymer electrolytes. The perfluorinated polymer electrolytes are chemically stable due to a strong binding force between carbon and fluorine (C—F) and a so-called shielding effect unique to fluorine atoms, and have excellent mechanical properties. Particularly, perfluorinated polymer electrolytes show high conductivity as proton exchange membranes, and thus are widely used as polymer electrolyte membranes in PEMFCs. As a typical example, Nafion, a perfluorinated polymer membrane developed by Dupont Inc. has been widely used as a proton exchange membrane in the field of fuel cells, because it shows excellent ion conductivity, chemical stability and ion selectivity. However, such perfluorinated polymer electrolyte membranes are problematic in that they are expensive in spite of their excellent quality, thereby degrading their industrial applicability, they cause a significant methanol crossover phenomenon including permeation of methanol through a polymer membrane, and they show a drop in efficiency of a polymer membrane at a temperature of 80° C. or higher. Therefore, there have been intensive studies about hydrocarbon-based ion exchange membranes, which show high cost-efficiency.

A polymer electrolyte membrane used in a fuel cell should be stable under the conditions required for driving the fuel cells. Thus, such polymer electrolyte membranes are required to have sufficient mechanical properties. When increasing the thickness of a membrane in order to improve mechanical properties, the membrane has an increased resistance, resulting in an undesired drop in ion conductivity of the membrane. When a fuel cell drives, the above poor-quality polymer membrane is decomposed due to electrochemical stresses including hydrolysis, oxidation and reduction, resulting in degradation in quality of the fuel cell. Additionally, a polymer electrolyte membrane for a fuel cell absorbs a significant amount of water in its hydrophilic domain, when a fuel cell drives. Water content of a polymer membrane has an effect on ion conductivity, mechanical stability and gas barrier property of an electrolyte membrane. Also, since a polymer electrolyte membrane has anisotropic characteristics, longitudinal expansion of a polymer electrolyte membrane generated during the hydration thereof depends not only on the humidity of the membrane but also on the alignment direction of the polymer. Further, mechanical properties and ion conductivity of a polymer electrolyte membrane vary with the alignment direction of the polymer. Therefore, there has been increasing interest in a reinforced composite polymer electrolyte membrane, which has a reduced thickness and resistance so as to increase ion conductivity while improving the dimensional stability thereof.

U.S. Pat. Nos. 5,547,551 and 5,559,614 disclose a process for manufacturing a composite electrolyte membrane having a thickness of 25 μm or less, the process comprising the steps of providing a microporous polytetrafluoroethylene film supported on polymer fibrils and filling micropores of the membrane with an ion exchange material. However, the above process for manufacturing a composite electrolyte membrane requires the use of a surfactant in order to prevent a phase separation phenomenon occurring between the microporous polytetrafluoroethylene film and the ion exchange material, and thus is problematic in that it requires a complicated post-treatment step of completely removing the surfactant and the portion, from which the surfactant is removed, may adversely affect driving of a fuel cell.

Disclosure of the Invention

It is an object of the present invention to provide various reinforced composite electrolyte membranes having a desired structure and/or physical properties while preventing a phase separation phenomenon occurring in the prior art and limiting the amount of a surfactant. Such reinforced composite electrolyte membranes are obtained by using a non-fluorinated or partially-fluorinated substrate as a microporous polymer substrate and by filling and coating the pores and surfaces of the substrate with a non-fluorinated or partially-fluorinated (fluorine content-limited) sulfonated hydrocarbon-based polymer electrolyte.

In order to achieve the above-mentioned object, the present invention provides a method for manufacturing a composite electrolyte membrane comprising a microporous polymer substrate and a sulfonated polymer electrolyte, the method comprising the steps of: applying a first non-fluorinated or partially-fluorinated sulfonated polymer electrolyte solution onto a base to form a first polymer electrolyte layer; stacking a non-fluorinated or partially-fluorinated microporous polymer substrate on the first polymer electrolyte layer and allowing a second non-fluorinated or partially-fluorinated sulfonated polymer electrolyte solution to infiltrate into pores of the microporous polymer substrate; and applying a third non-fluorinated or partially-fluorinated sulfonated polymer electrolyte solution onto the microporous polymer substrate impregnated with the second polymer electrolyte to form a third polymer electrolyte layer.

Additionally, the present invention provides a composite electrolyte membrane including a microporous polymer substrate and a sulfonated polymer electrolyte, the composite electrolyte membrane comprising: a first polymer electrolyte layer formed of a first non-fluorinated or partially-fluorinated sulfonated polymer electrolyte; a non-fluorinated or partially-fluorinated microporous polymer substrate stacked on the first polymer electrolyte layer, wherein pores of the microporous polymer substrate are impregnated with a second non-fluorinated or partially-fluorinated sulfonated polymer electrolyte, and the first polymer electrolyte and the second polymer electrolyte are entangled with each other on an interface thereof; and a third polymer electrolyte layer formed on the microporous polymer substrate impregnated with the second polymer electrolyte by a third non-fluorinated or partially-fluorinated sulfonated polymer electrolyte, wherein the second polymer electrolyte and the third polymer electrolyte are entangled with each other on an interface thereof. The present invention also provides membrane-electrode assembly (MEA) and a fuel cell using the above composite electrolyte membrane.

Hereinafter, the present invention will be explained in more detail.

Herein, the language, "partially-fluorinated" means that fluorine atoms are introduced into some of side chains attached to a main chain of a polymer, unlike a completely-fluorinated polymer in which fluorine atoms are introduced into all side chains attached to a main chain of the polymer. For example, a polymer having the structure of —(—CF$_2$—CF$_2$—)$_n$— such as PTFE is a completely-fluorinated polymer. A polymer having the structure of —(—CH$_2$—CF$_2$)$_n$— such as PVDF is a partially-fluorinated polymer. A copolymer consisting of two or more polymers is a partially-fluorinated polymer, if the copolymer uses one or more polymers, which contain fluorinate atoms, concurrently with the polymers, which do not contain fluorinate atoms.

The method for manufacturing a composite electrolyte membrane according to the present invention is characterized by comprising the steps of: applying a first non-fluorinated or partially-fluorinated sulfonated polymer electrolyte solution onto a base to form a first polymer electrolyte layer; stacking a non-fluorinated or partially-fluorinated microporous polymer substrate on the first polymer electrolyte layer and allowing a second non-fluorinated or partially-fluorinated sulfonated polymer electrolyte solution to infiltrate into pores of the microporous polymer substrate; and applying a third non-fluorinated or partially-fluorinated sulfonated polymer electrolyte solution onto the microporous polymer substrate impregnated with the second polymer electrolyte to form a third polymer electrolyte layer.

Herein, each of the second polymer electrolyte incorporated into the pores of the microporous polymer substrate, and the first polymer electrolyte layer and the third polymer electrolyte layer formed on both surfaces of the microporous polymer substrate may be formed individually under an independent condition, so as to provide various composite electrolyte membranes having a desired structure and/or physical properties (see FIG. 2).

For example, each of the first sulfonated polymer electrolyte, the second sulfonated polymer electrolyte and the third sulfonated polymer electrolyte may be controlled independently in terms of the molecular weight. Also, each of the above three polymer electrolytes may be controlled independently in terms of the concentration of each polymer electrolyte solution, presence or absence of a surfactant, amount of a surfactant, methods for applying the polymer electrolytes, etc. Further, since the thickness of the first polymer electrolyte layer and that of the third polymer electrolyte layer may be controlled independently and both polymer electrolyte layers may be easily formed to have the same thickness, it is possible to provide a composite electrolyte membrane having a microporous polymer substrate disposed at the center of the composite electrolyte membrane when viewed from its thickness direction. Because most microporous polymer substrates lack proton conductivity, there may be a side effect of partially inhibiting proton conduction in an electrolyte membrane. However, the above composite electrolyte membrane, which has a microporous polymer substrate disposed at the center of the composite electrolyte membrane when viewed from its thickness direction, allows protons to flow uniformly along the polymer electrolyte formed inside the microporous polymer substrate and the polymer electrolytes formed on both surfaces of the microporous polymer substrate, and thus can prevent the above-mentioned side effect.

Meanwhile, according to the method of the present invention, it is possible to provide a composite electrolyte membrane, wherein the first polymer electrolyte and the second polymer electrolyte are entangled with each other on an interface thereof and the second polymer electrolyte and the third polymer electrolyte are entangled with each other on an interface thereof. Thus, the polymer electrolytes are entangled with each other and adhered well to the interfaces. As a result, it is possible to prevent a phase separation phenomenon, and thus to provide a composite electrolyte membrane free from an obstacle to proton conduction caused by such phase separation.

The microporous substrate used in the present invention serves as a support for an electrolyte membrane to improve the mechanical integrity and dimensional stability of the electrolyte membrane depending on water content thereof. Additionally, the non-fluorinated sulfonated hydrocarbon-based polymer electrolyte and/or partially-fluorinated sulfonated hydrocarbon-based polymer electrolyte formed in the pores and/or on both surfaces of the microporous polymer substrate imparts ion conductivity to the electrolyte membrane.

When using a non-fluorinated or partially-fluorinated polymer substrate as a microporous substrate and a non-fluorinated or partially-fluorinated sulfonated polymer solution containing a surfactant as an electrolyte incorporated into the pores of the substrate, it is possible to inhibit phase separation phenomena occurring between the microporous substrate and the electrolyte incorporated into the pores thereof, as well as between the microporous substrate and the electrolyte layers formed on both surfaces thereof.

By inhibiting phase separation phenomena as described above, the pores of the microporous polymer substrate can be easily filled with the polymer electrolyte via a simple process such as pouring a non-fluorinated or partially-fluorinated sulfonated polymer electrolyte solution onto a non-fluorinated or partially-fluorinated microporous polymer substrate. Additionally, the non-fluorinated or partially-fluorinated microporous polymer substrate shows an increased affinity to a non-fluorinated sulfonated polymer electrolyte as compared to a perfluorinated microporous polymer substrate, thereby inhibiting a phase separation phenomenon. Further, because the non-fluorinated microporous polymer substrate, particularly a polyolefin-based microporous polymer substrate is cheaper than a perfluorinated microporous polymer substrate, the composite electrolyte membrane according to the present invention is preferable in terms of cost-efficiency.

In addition, because a phase separation phenomenon can be inhibited as described above, the composite electrolyte membrane according to the present invention requires no surfactant or merely a low amount of surfactant during the manufacture thereof. Thus, it is possible to avoid a need for complicated steps of adding and removing a surfactant, and other problems caused by a surfactant remaining after the removal. As a result, according to the present invention, it is possible to simplify a process for manufacturing a reinforced composite electrolyte membrane and to provide a reinforced composite electrolyte membrane with uniform quality. Further, because the composite electrolyte membrane according to the present invention causes no phase separation between the electrolyte solutions and the microporous polymer substrate, the composite electrolyte membrane can maintain physical properties even when driven for a long period of time.

(1) Non-fluorinated or partially-fluorinated microporous polymer substrate

According to an aspect of the present invention, a non-fluorinated or partially-fluorinated polymer substrate is used as a microporous substrate in order to inhibit a phase separation phenomenon between the microporous substrate and the electrolyte incorporated into the pores thereof.

Non-limiting examples of the non-fluorinated or partially-fluorinated microporous polymer substrate that may be used in the present invention include polyethylene, polypropylene, polyvinyldifluoroethylene, polyethylene terephthalate, polyimide, polyamide, or a mixture thereof.

The microporous polymer substrate has a thickness ranging from 3 µm to 1,000 µm, preferably from 5 µm to 50 µm, a porosity ranging from 20% to 95%, preferably from 60% to 95%, and a pore size ranging from 0.05 µm to 20 µm, preferably from 0.1 µm to 2 µm.

The microporous polymer substrate may be provided in various forms and non-limiting examples thereof include a fibril form, woven cloth form, non-woven cloth form, sponge form, or the like.

(2) First, second and third polymer electrolytes

The first polymer electrolyte layer and the third polymer electrolyte layer formed on both surfaces of the microporous polymer substrate according to the present invention can solve the problem of deterioration of the quality of a composite electrolyte membrane caused by a microporous film that has no proton conductivity and is in direct contact with an electrode. In the electrolyte membrane that may be obtained according to the present invention, protons freely move along the first polymer electrolyte layer, the second polymer electrolyte layer incorporated into the pores of the microporous substrate and the third polymer electrolyte layer, and thus participate in electrochemical reactions for generating electricity. Also, the polymer electrolyte layers are supported by the microporous substrate, so that the composite electrolyte membrane according to the present invention can maintain its physical properties.

Preferably, the second polymer electrolyte incorporated into the pores of the microporous polymer substrate according to the present invention is a non-fluorinated or partially-fluorinated sulfonated polymer. Additionally, it is preferable to form the first polymer electrolyte layer and the third polymer electrolyte layer present on both surfaces of the microporous polymer substrate independently from each other by using a non-fluorinated or partially-fluorinated sulfonated polymer.

Sulfonic acid groups in the polymer electrolytes exhibit proton conductivity and show hydrophilicity.

The non-fluorinated or partially-fluorinated sulfonated polymer electrolytes may be selected from homopolymers, alternating copolymers, random copolymers, block copolymers, multiblock copolymers and graft copolymers comprising at least one sulfonated hydrocarbon-based polymer selected from the group consisting of sulfonated poly(arylene ether)s, sulfonated poly(imide)s, sulfonated poly(amide)s, sulfonated polyphosphazene, sulfonated polystyrene, sulfonated radiation-grafted FEP-g-polystyrene, sulfonated radiation-grafted ETFE-g-polystyrene, sulfonated radiation-grafted LDPE-g-polystyrene, sulfonated radiation-grafted PVDF-g-polystyrene, or the like.

Meanwhile, each of the first polymer electrolyte layer and the third polymer electrolyte layer independently has a thickness of 1 µm~50 µm.

The composite electrolyte membrane according to the present invention preferably has a thickness of 10 µm~100 µm.

Each of the first polymer electrolyte solution, the second polymer electrolyte solution and the third electrolyte solution is provided to have a concentration of 1~40 wt %, preferably 2~15 wt %.

Solvents of the sulfonated polymer electrolyte solutions may include conventional organic solvents, water or mixtures of organic solvents. Non-limiting examples of the organic solvents include dimethyl acetamide, dimethyl formamide, dimethyl sulfoxide, N-methyl pyrrolidone, alcohols, or the like. Also, the same solvent as used for preparing the non-fluorinated or partially-fluorinated hydrocarbon-based polymer electrolytes according to the present invention may be used.

Meanwhile, it is preferred that the second polymer electrolyte solution contains a surfactant, while the first polymer electrolyte solution and the third polymer electrolyte solution contain no surfactant. Although the surfactant serves to allow the pores of the microporous polymer substrate to be well impregnated with the polymer electrolyte, it should be removed after forming a membrane. If any surfactant is not removed and remains in the composite electrolyte membrane, it may adversely affect the quality of the composite electrolyte membrane. Thus, it is necessary to use such surfactant in a minimized amount. Therefore, it is preferred that the surfactant is added only to the second polymer electrolyte solution to be incorporated directly into the pores of the microporous polymer substrate.

The surfactant may be removed after forming a membrane, for example, by agitating the membrane in distilled water, methanol, ethanol, isopropanol, or the like.

(3) Base for forming first polymer electrolyte layer

The base for forming the first polymer electrolyte layer is preferably formed of a material having a uniform surface, no scar and excellent chemical resistance and heat resistance, for example, glass, stainless steel (SUS), etc.

In the first step, the first polymer electrolyte layer is formed on the base. Then, the base is preferably removed after the completion of the manufacture of the electrolyte membrane.

(4) Method for manufacturing composite electrolyte membrane

In the method, the first step of applying the first polymer electrolyte solution onto the base to form the first polymer electrolyte layer, and the third step of applying the third polymer electrolyte solution onto the microporous polymer substrate impregnated with the second polymer electrolyte to form the third polymer electrolyte layer may be performed via a solution pouring process. Herein, thickness of each layer is preferably controlled by using a film applicator in such a manner that each layer has a thickness of 1~50 μm.

Additionally, the second step of impregnating the pores of the microporous polymer substrate with the second polymer electrolyte solution may be performed, for example, via a solution pouring process in which the non-fluorinated or partially-fluorinated sulfonated polymer electrolyte solution is poured onto the non-fluorinated or partially-fluorinated microporous polymer substrate. The solution pouring process may be performed in a conventional manner. Preferably, thickness of the electrolyte solution applied onto the microporous substrate is controlled by using a film applicator in such a manner that the resultant reinforced composite electrolyte membrane has a thickness of several tens to several hundreds micrometers.

Preferably, after carrying out each of the first step, the second step and the third step, the solvent used in each step is removed.

Herein, removal of each solvent is preferably performed via drying in an oven at a temperature of 50~150° C. under vacuum or ambient conditions.

According to the present invention, each of the above three steps may be performed independently and repeatedly at least once. In this case, the same or different polymer electrolyte solution and the same or different process for applying the polymer electrolyte solution may be used in each step.

To allow the pores of the microporous substrate to be completely filled with the non-fluorinated or partially-fluorinated sulfonated polymer electrolyte solution, application and drying of the solution may be performed repeatedly via a solution pouring process using the sulfonated polymer electrolyte solution. By doing so, both surfaces of the microporous substrate may be completely covered with the sulfonated polymer electrolyte.

(5) Membrane-electrode assembly and fuel cell

A membrane-electrode assembly (MEA) according to the present invention may be manufactured by inserting the composite electrolyte membrane according to the present invention between an anode and a cathode via a hot pressing process. The hot pressing process is performed preferably under a pressure of 0.5~2 tons at a temperature of 100~150° C.

Additionally, it is possible to provide a fuel cell having improved quality and excellent durability by using the MEA comprising the composite electrolyte membrane according to the present invention. Non-limiting examples of the fuel cell include PEMFCs (polymer electrolyte membrane fuel cells), DMFCs (direct methanol fuel cells), or the like.

BRIEF DESCRIPTION OF THE DRAWINGS

The foregoing and other objects, features and advantages of the present invention will become more apparent from the following detailed description when taken in conjunction with the accompanying drawings in which.

MODE FOR CARRYING OUT THE INVENTION

Reference will now be made in detail to the preferred embodiments of the present invention. However, the following examples are illustrative only, and the scope of the present invention is not limited thereto.

EXAMPLE 1

Figure 1:
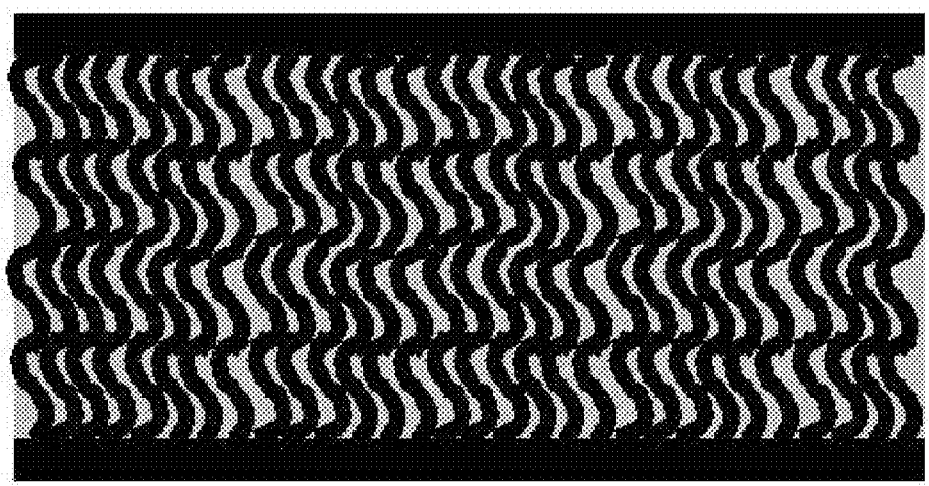
FIG. 1 is a two-dimensional schematic view of the composite electrolyte membrane that may be obtained according to the present invention.
Figure 2:
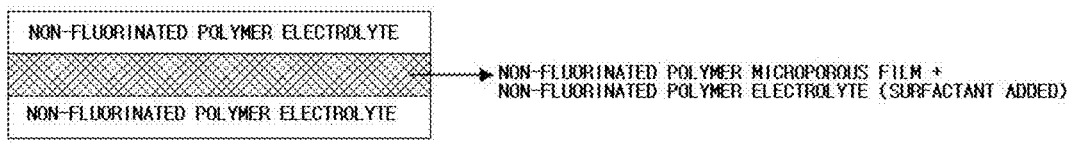
FIG. 2 is a schematic sectional view of the composite electrolyte membrane that may be obtained according to a preferred embodiment of the present invention.
Figure 3:
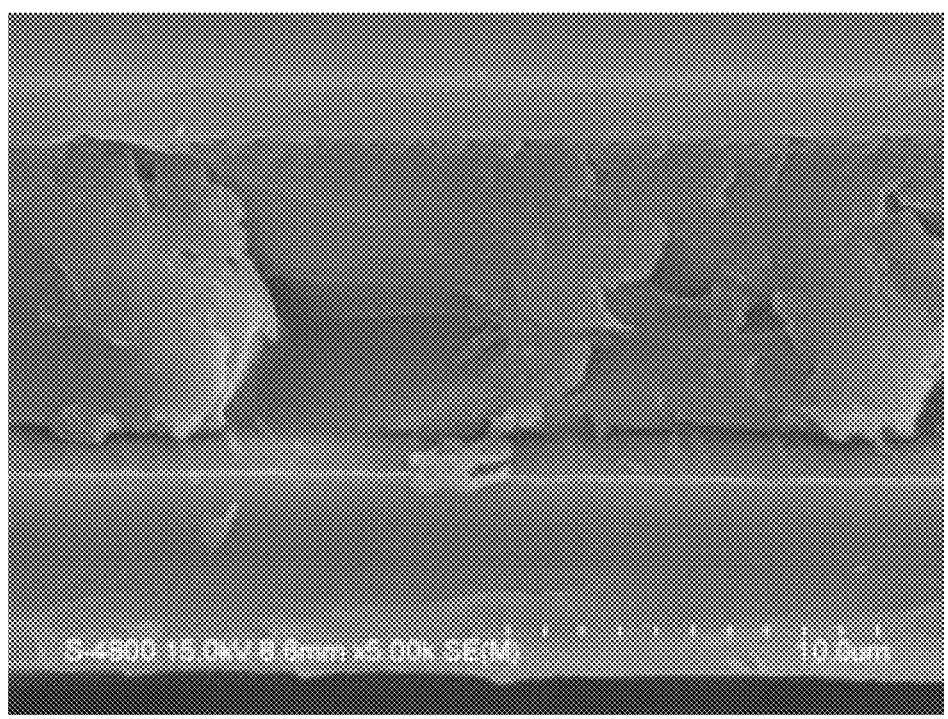
FIG. 3 is a sectional image of the composite electrolyte membrane according to Example 1, taken by SEM (scanning electron microscopy)

Manufacture Of Reinforced Composite Electrolyte Membrane Using First And Third Polymer Electrolyte Solutions Containing No Surfactant, Second Polymer Electrolyte Solution Containing Surfactant, and a Non-Fluorinated Microporous Polymer Substrate First, 10 g of a sulfonated poly(ether ketone) block copolymer, prepared according to examples disclosed in Korean Patent Application No. 10-2004-0110487, was dissolved in 90 g of dimethyl formamide (DMF), and the resultant solution was filtered through a BORU glass filter (pore size 3) to remove dust, etc. Next, 30 g of the above solution was separately used to form a second polymer solution to which 4% of Triton X-100 (a surfactant) was added. The remaining 70 g of the solution was used to provide a first polymer solution and a third polymer solution. Then, a polyethylene-based microporous film was washed with ethanol, followed by drying. The first polymer solution was poured onto a glass base and the copolymer solution applied onto the glass base was leveled by using a film applicator. The copolymer solution was dried in an oven at 80° C. for 2 hours or more, and then the polyethylene-based microporous film was stacked smoothly onto the resultant first polymer layer. The second polymer solution containing a surfactant added thereto was poured onto the microporous film and the copolymer solution applied onto the microporous film was leveled by using a film applicator. The copolymer solution was dried in an oven at 80° C. for 2 hours or more. Further, the third polymer solution was poured onto the microporous film containing the second polymer. Then, the copolymer solution was dried in an oven at 80° C. for 2 hours or more to provide a reinforced composite electrolyte membrane having a thickness of 50 μm. FIG. 3 is the sectional image of the reinforced composite electrolyte membrane obtained as described above, taken by SEM (scanning electron microscopy).

COMPARATIVE EXAMPLE 1

Manufacture of Electrolyte Membrane Using Sulfonated Block Copolymer

The sulfonated poly(ether ketone) block copolymer solution as described in Example 1 was poured onto a glass base and the copolymer solution applied on the glass base was leveled by using a film applicator. Then, the copolymer solution was dried in an oven at 80° C. for 2 hours or more to provide an electrolyte membrane having a thickness of 50 μm.

EXAMPLE 2

Figure 4:
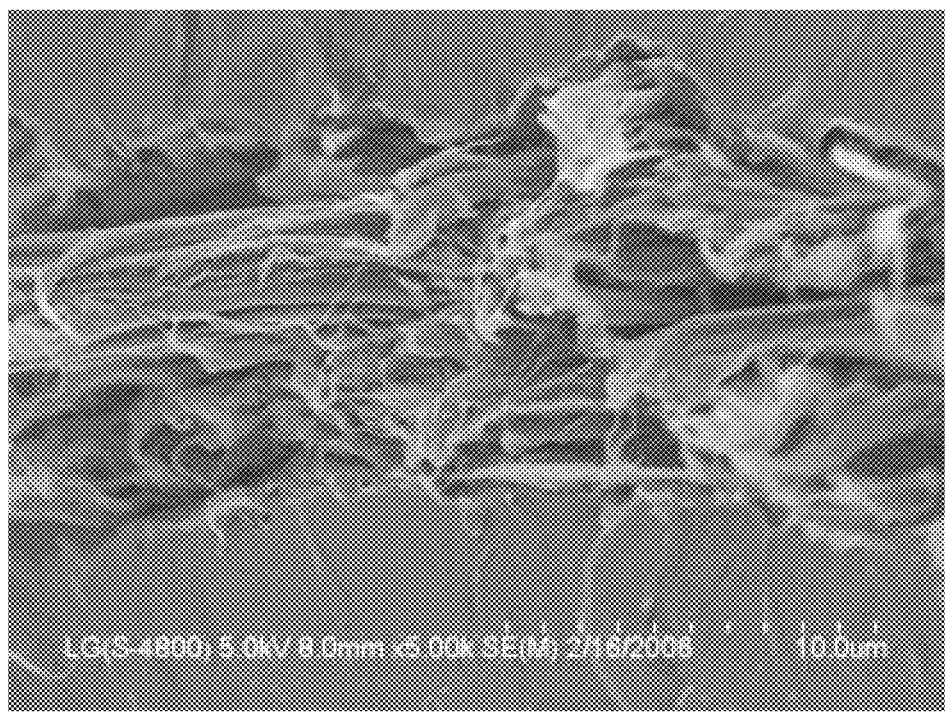
FIG. 4 is a sectional image of the composite electrolyte membrane according to Example 2, taken by SEM.

Manufacture of Reinforced Composite Electrolyte Membrane Using No Surfactant in First, Second and Third Polymer Electrolyte Solutions and Using a Non-Fluorinated Microporous Polymer Substrate An electrolyte membrane having a thickness of 50 μm was provided in the same manner as described in Example 1, except that the same sulfonated poly(ether ketone) block copolymer solution was used as the first polymer solution, the second polymer solution and as the third polymer solution (i.e. the second polymer solution contained no surfactant). FIG. 4 is the sectional image of the reinforced composite electrolyte membrane obtained as described above, taken by SEM.

COMPARATIVE EXAMPLE 2

Figure 5:
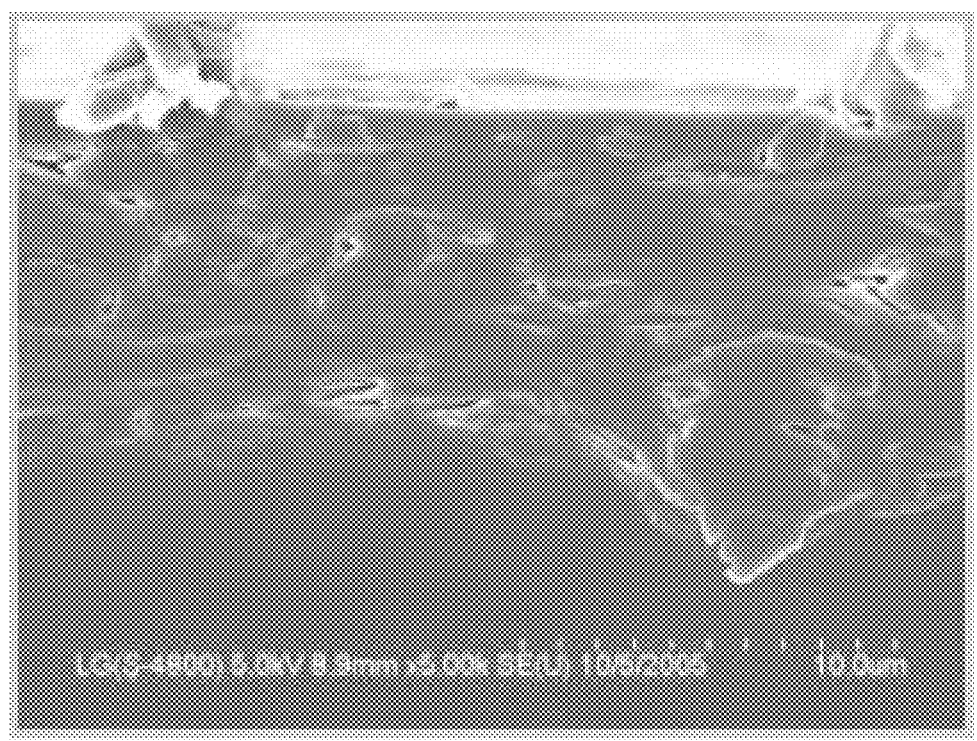
FIG. 5 is a sectional image of the composite electrolyte membrane according to Comparative Example 2, taken by SEM.

Manufacture of Reinforced Composite Electrolyte Membrane Using Neither Surfactant Nor Multi-Coating Process A polyethylene-based microporous film was washed with ethanol, followed by drying. The polyethylene-based microporous film was stacked smoothly onto a glass base, and the sulfonated poly(ether ketone) block copolymer solution used in Example 1 was poured onto the microporous film and the copolymer solution applied onto the microporous film was leveled by using a film applicator. The copolymer solution was dried in an oven at 80° C. for 2 hours or more to provide an electrolyte membrane having a thickness of 50 μm. FIG. 5 is the sectional image of the reinforced composite electrolyte membrane obtained as described above, taken by SEM.

EXAMPLE 3

Manufacture of Reinforced Composite Electrolyte Membrane Using First and Third Polymer Electrolyte Solutions Containing No Surfactant, Second Polymer Electrolyte Solution Containing Surfactant, and a Partially-Fluorinated Microporous Polymer Substrate An electrolyte membrane having a thickness of 50 μm was provided in the same manner as described in Example except that a polyvinyldifluoroethylene microporous membrane, which is a partially-fluorinated microporous membrane, was used instead of a polyethylene microporous membrane, which is a non-fluorinated microporous membrane, and that fluorinated surfactant was used instead of the surfactant used in Example 1, i.e., Triton X-100 in order to increase the affinity between the microporous membrane and the sulfonated poly(ether ketons) block copolymer solution used in Example 1.

EXPERIMENTAL EXAMPLES

The following tests were performed to determine IEC (ion exchange capacity), mechanical properties, methanol crossover and dimensional stability of the reinforced composite electrolyte membrane according to Example 1 and the electrolyte membrane according to Comparative Example 1.

(A) Ion exchange capacity (IEC) and mechanical properties

First, 0.5 g of each of the electrolyte membranes according to Example 1 and Comparative Example 1 was hydrated in ultrapure water at 100° C. for 2 hours and dipped into 100 mL of saturated aqueous NaCl solution for at least 10 hours to substitute protons ($H^+$) with sodium ions ($Na^+$). The concentration of protons substituted with sodium ions was titrated with 0.1N NaOH standard solution. Then, IEC value of each membrane was calculated according to the following Mathematical Formula 1 by using the volume of NaOH used for the titration. The results are shown in the following Table 1. IEC value of Nafion 112 available from Dupont Co. is also shown as a reference value.

IEC(—$SO_3H$ meqiv./g)=(volume (mL) of consumed NaOH standard solution×0.1N)/weight (g) of dried thin film　　[Mathematical Formula 1]

Mechanical strength of each electrolyte membrane was measured by using Zwick® UTM. Under the conditions of room temperature and a humidity of 25%, each of the electrolyte membranes according to Example 1 and Comparative Example 1 was converted into a dog bone-shaped film satisfying the requirements defined by ASTM D-882 (standard test method for tensile properties of thin plastic sheeting). Then, tensile strength of each film was measured five times under a crosshead speed of 50 mm/min. The average of the measured values for each film is shown in the following Table 1.

TABLE 1

| Item | IEC (meq./g) | Apparent physical properties | Tensile strength (Mpa) | Elongation (%) |
|---|---|---|---|---|
| Ex. 1 | 1.38 | transparent excellent | 76 | 17 |
| Comp. Ex. 1 | 1.41 | transparent excellent | 70 | 14 |
| Nafion 112 | 0.91 | transparent excellent | 43 | 225 |

As can be seen from Table 1, the reinforced composite membrane of Example 1 according to the present invention shows a slight drop in IEC when compared to the electrolyte membrane of Comparative Example 1. On the contrary, the reinforced composite electrolyte membrane of Example 1 shows tensile strength and elongation improved by 10% and 20%, respectively, when compared to the electrolyte membrane of Comparative Example 1.

(B) Methanol (MeOH) crossover

Methanol crossover of each of the electrolyte membranes according to Example 1 and Comparative Example 1 was measured by using a diffusion cell system. First, 10M aqueous methanol solution and pure water were introduced into the left cell and the right cell, respectively, and each electrolyte membrane was inserted in the middle of both cells. Then, methanol crossover was obtained by calculating a variation in methanol concentration ($C_i(t)$) in the right cell over time (t) while sampling the solution in the right cell. Herein, methanol crossover ($D_i \cdot K_i$) was calculated by using the thickness (L) of an electrolyte membrane, exposed area (A) of the corresponding membrane, the volume (V) of the right cell, and the initial methanol concentration ($C_{i0}$) of the left cell according to the following Mathematical Formula 2. The results are shown in the following Table 2, and methanol crossover of Nafion 112 is also shown as a reference value.

$C_i(t) = \{(A \cdot D_i \cdot K_i \cdot C_{io})/V \cdot L\} \times t$　　[Mathematical Formula 2]

TABLE 2

| Item | Ex. 1 | Comp. Ex. 1 | Nafion 112 |
|---|---|---|---|
| Methanol crossover ($10^{-6} * cm^2$/sec) | 1.05 | 1.8 | 2.4 |

As can be seen from Table 2, the reinforced composite electrolyte membrane according to Example 1 shows a lower methanol crossover when compared to the electrolyte membrane according to Comparative Example 1, and has improved methanol barrier characteristics when compared to the currently used polymer membrane, Nafion.

(C) Dimensional Stability

Each of the electrolyte membranes according to Example 1 and Comparative Example 1 was cut into a size of 4×4 cm, hydrated in ultrapure water at 80° C. for 4 hours, and then measured for variations in size of each electrolyte membrane. The results are shown in the following Table 3, and a variation in size of Nafion 112 available from Dupont Co. is also shown as a reference value.

TABLE 3

| Item | Ex. 1 width × length | Comp. Ex. 1 width × length | Nafion 112 width × length |
|---|---|---|---|
| Before hydration | 4.0 × 4.0 | 4.0 × 4.0 | 4.0 × 4.0 |
| After hydration | 4.4 × 4.4 | 6.2 × 6.2 | 4.6 × 4.6 |

As can be seen from Table 3, the reinforced composite electrolyte membrane of Example 1 according to the present invention shows significantly improved dimensional stability when compared to the electrolyte membrane according to Comparative Example 1.

<Discussion>

As can be seen from FIG. 3, the reinforced composite electrolyte membrane according to Example 1 includes polymer electrolyte layers formed on the top and bottom surfaces of a layer comprising a microporous polymer substrate and the pores of the microporous polymer substrate are sufficiently filled with a polymer electrolyte. Meanwhile, as can be seen from FIG. 4, the reinforced composite electrolyte membrane according to Example 2 includes polymer electrolyte layers formed on the top and bottom surfaces of a layer comprising a microporous polymer substrate, but the pores of the microporous polymer substrate are partially vacant because the pores are not sufficiently filled with a polymer electrolyte.

Additionally, as can be seen from FIG. 5, the reinforced composite electrolyte membrane according to Comparative Example 2 includes a layer comprising a microporous polymer substrate at the top thereof. Therefore, it is problematic in that the microporous polymer substrate may be in direct contact with an electrode layer.

INDUSTRIAL APPLICABILITY

As can be seen from the foregoing, the reinforced composite electrolyte membrane comprising a microporous polymer film and a non-fluorinated or partially-fluorinated sulfonated polymer electrolyte has excellent mechanical properties and dimensional stability when compared to an electrolyte membrane comprising the sulfonated polymer electrolyte alone. Therefore, it is possible to provide a composite electrolyte membrane by using a non-fluorinated or partially-fluorinated hydrocarbon-based polymer electrolyte having high proton conductivity, which was not applicable according to the prior art due to its low mechanical properties and dimensional stability, in combination with a microporous film. By doing so, it is possible to provide a reinforced composite electrolyte membrane having improved proton conductivity and mechanical properties.

Additionally, according to the present invention, it is possible to provide various reinforced composite electrolyte membranes having a desired structure and/or physical properties while preventing a phase separation phenomenon and limiting the amount of a surfactant by using a non-fluorinated or partially-fluorinated substrate as a microporous polymer substrate and by filling and coating pores and both surfaces of the substrate with a non-fluorinated or (fluorine content-limited) partially-fluorinated sulfonated hydrocarbon-based polymer electrolyte via a multilayer coating process.

Although several preferred embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. A membrane-electrode assembly comprising an anode, a cathode and a composite electrolyte membrane provided between the anode and the cathode,
    wherein the composite electrolyte membrane including a microporous polymer substrate and a sulfonated polymer electrolyte, the composite electrolyte membrane comprising:
    a first polymer electrolyte layer formed of a first non-fluorinated sulfonated polymer electrolyte;
    a non-fluorinated microporous polymer substrate stacked on the first polymer electrolyte layer, wherein pores of the microporous polymer substrate are impregnated with a second non-fluorinated sulfonated polymer electrolyte, and the first polymer electrolyte and the second polymer electrolyte are entangled with each other on an interface thereof,
    a third polymer electrolyte layer formed on the microporous polymer substrate impregnated with the second polymer electrolyte by a third non-fluorinated sulfonated polymer electrolyte, wherein the second polymer electrolyte and the third polymer electrolyte are entangled with each other on an interface thereof,
    the first non-fluorinated sulfonated polymer electrolyte, the second non-fluorinated sulfonated polymer electrolyte, and the third non-fluorinated sulfonated polymer electrolyte are each independently selected from the group consisting of homopolymers, alternating copolymers, random copolymers, block copolymers, multi-block copolymers and graft copolymers, and
    the first non-fluorinated sulfonated polymer electrolyte, the second non-fluorinated sulfonated polymer electrolyte, and the third non-fluorinated sulfonated polymer electrolyte independently comprises at least one sulfonated hydrocarbon-based polymer selected from the group consisting of sulfonated poly(arylene ether)s, sulfonated poly(amide)s, sulfonated polyphosphazene, sulfonated radiation-grafted FEP-g-polystyrene, sulfonated radiation-grafted ETFE-g-polystyrene, sulfonated radiation-grafted LDPE-g-polystyrene, sulfonated radiation-grafted PVDF-g-polystyrene,
    wherein each of the first polymer electrolyte layer and the third polymer electrolyte layer independently has a thickness of 1μm-50 μm.

2. The membrane-electrode assembly according to claim 1,
    wherein the composite electrolyte membrane is manufactured in accordance with a method comprising:
    a first step of applying a solution of the first non-fluorinated sulfonated polymer electrolyte onto a base to form the first polymer electrolyte layer;
    a second step of stacking the non-fluorinated microporous polymer substrate on the first polymer electrolyte layer and allowing a solution of the second non-fluorinated sulfonated polymer electrolyte to infiltrate into pores of the microporous polymer substrate; and a third step of applying a solution of the third non-fluorinated sulfonated polymer electrolyte onto the microporous polymer substrate impregnated with the second polymer electrolyte to form the third polymer electrolyte layer.

3. The membrane-electrode assembly according to claim 1, wherein the microporous polymer substrate is formed of at least one material selected from the group consisting of polyethylene, polypropylene, polyethylene terephthalate, polyimide and polyamide.

4. The membrane-electrode assembly according to claim 1, wherein the microporous polymer substrate has a thickness ranging from 3μm to 1,000 μm, a porosity ranging from 20% to 95%, and a pore size ranging from 0.05μm to 20μm.

5. The membrane-electrode assembly according to claim 1, which has a thickness of 10 μm-100 μm.

6. The membrane-electrode assembly according to claim 1, wherein the second polymer electrolyte layer is formed by using a surfactant, while the first polymer electrolyte layer and the third polymer electrolyte layer are formed by using no surfactant.

7. The membrane-electrode assembly according to claim 1, wherein the microporous polymer substrate is impregnated with the second polymer electrolyte via a solution pouring process using a solution of the second polymer electrolyte.

8. A fuel cell comprising the membrane-electrode assembly composite electrolyte membrane as defined in claim 1.

* * * * *